| United States Patent [19] | [11] Patent Number: 4,978,705 |
| Lamont | [45] Date of Patent: Dec. 18, 1990 |

[54] SILICONE RUBBER CONTAINING ALKALI METAL SALTS OF PHOSPHORIC ACID AND PHOSPHOROUS ACID AND COMPOSITIONS THEREFOR

[75] Inventor: Peter Lamont, Midland, Mich.

[73] Assignee: Dow Corning Corporation, Midland, Mich.

[21] Appl. No.: 251,148

[22] Filed: Sep. 29, 1988

Related U.S. Application Data

[63] Continuation-in-part of Ser. No. 137,985, Dec. 24, 1987, abandoned.

[51] Int. Cl.$^5$ ................................................ C08K 3/32
[52] U.S. Cl. .................................. 524/417; 524/414; 524/706; 521/154

[58] Field of Search ............... 524/414, 417, 706, 860; 521/154

[56] References Cited

U.S. PATENT DOCUMENTS

| Re. 31,843 | 3/1985 | Noble et al. | 523/212 |
| 3,862,082 | 1/1975 | Hatanaka et al. | 524/413 |
| 4,695,597 | 9/1987 | Seino | 521/154 |

*Primary Examiner*—John C. Bleutge
*Assistant Examiner*—Ralph Dean, Jr.
*Attorney, Agent, or Firm*—Roger H. Borrousch

[57] ABSTRACT

Silicone rubber compositions prepared from polydiorganosiloxane and small amounts of alkali metal hydrogen phosphates or alkali metal hydrogen phosphites improve the properties of the silicone rubber, such as compression set and flame retardancy.

11 Claims, No Drawings

SILICONE RUBBER CONTAINING ALKALI METAL SALTS OF PHOSPHORIC ACID AND PHOSPHOROUS ACID AND COMPOSITIONS THEREFOR

This application is a continuation-in-part of U.S. patent application Ser. No. 137,985, filed Dec. 24, 1987.

BACKGROUND OF THE INVENTION

1. Field of the Invention

This invention relates to silicone rubber composition and to silicone rubber. This invention also relates to a method of improving the flame retardancy of a silicone rubber.

2. Background Information

The silicone rubber art is filled with methods and additives which are designed to improve the properties of the silicone rubber. Many of these methods and additives are complex, expensive, and difficult to use. For example in the art of making silicone rubber flame retardant, platinum compounds are added to the silicone rubber composition. Platinum is expensive even in small amounts. Because the amounts of platinum used are small, parts per million, and because it is susceptible to poisoning, care must be taken to avoid materials and environments which can poison the platinum thus making it ineffective as a flame retardant. However, platinum alone is not enough for most applications and additional ingredients are needed to further improve the flame retardant property These additional ingredients might be the rare earth oxides and hydroxides which are also expensive. Other additives which can be used are carbon black and fumed titanium dioxide. The carbon black, although effective in improving the flame retardant property, only allows the production of black or grayish products and many applications require transparent materials or a color other than black or gray, such as in electrical insulation for wiring. Some of the means used to improve the flame retardancy of the silicone rubber destroy the physical properties of the silicone rubber to such a great extent that the silicone rubber becomes unusable for the application for which it was designed.

SUMMARY OF THE INVENTION

It was completely unexpected that small amounts of alkali metal salts of phosphoric acid or phosphorous acid which contain hydrogen could provide valuable improvement in the properties of silicone rubber, such as flame retardancy and compression set.

The present invention relates to a silicone rubber composition comprising a polydiorganosiloxane and an anhydrous alkali metal salt of phosphoric acid or phosphorous acid or mixtures thereof in which the salt contains hydrogen and is present in amounts of from 0.0002 to 0.052 weight percent based on the total weight of the composition.

The present invention also relates to a method of improving the flame retardant property of a silicone rubber comprising incorporating into the silicone rubber composition, before curing, from 0.0002 to 0.052 weight percent of an anhydrous salt selected from the group consisting of di-(alkali metal) hydrogen phosphate, alkali metal dihydrogen phosphate, di-(alkali metal) hydrogen phosphite, alkali metal dihydrogen phosphite, and mixtures thereof.

DESCRIPTION OF THE PREFERRED EMBODIMENTS

Today silicone rubber is well known in the art and many kinds are commercially available. Silicone rubber can be derived from a composition which comprises a polydiorganosiloxane as the base polymer. The polydiorganosiloxane is the major ingredient in the composition when fillers are excluded. Fillers can often be present in amounts of greater than 50 weight percent of the total weight of the composition. Silicone rubber compositions comprise polydiorganosiloxane and some means for curing the composition such as a crosslinking catalyst. For example, the polydiorganosiloxane can be crosslinked with a heat curable means or a room temperature means. Heat curable means include organic peroxides and hydrosilation catalyzed compositions where the cure is inhibited at room temperatures and which comprise aliphatically unsaturated polydiorganosiloxanes, polysiloxanes having silicon-bonded hydrogen atoms and a hydrosilation catalyst such as a platinum catalyst.

Room temperature curable compositions include the hydrosilation catalyzed compositions which are not room temperature inhibited, and compositions which comprise polydiorganosiloxanes with hydrolyzable end groups or hydroxyl end groups and a silane or siloxane crosslinker having hydrolyzable groups. The compositions having the hydrolyzable groups can be either single package or two package materials. Single package materials are those which are stored in a single package which protects the composition from moisture and when cure is desired the composition is extruded from the tube and allowed to contact atmospheric moisture and cure occurs. Two package materials are those which have some ingredients in one package and some ingredients in at least one other package and when cure is desired the contents of the two packages are mixed and cure occurs. Two package materials are used because the ingredients if stored in a single package would prematurely cure and thus not be useful. Many of these compositions are known to the art and many are commercially available. However, there is still a need to improve their properties, such as flame retardancy and compression set, among others.

The polydiorganosiloxanes can be prepared by many well known methods and include triorganosiloxy endblocked polydiorganosiloxanes, hydroxyl endblocked polydiorganosiloxanes, those polydiorganosiloxanes which are endblocked with siloxy units having one, two or three hydrolyzable groups, and mixtures of polydiorganosiloxanes such as those in which some of the polymer molecules are endblocked with hydroxyl groups and some are endblocked on one end with a hydroxyl group and the other end is endblocked with a triorganosiloxy unit. The mixtures of polydiorganosiloxanes which contain both hydroxyl endgroups and triorganosiloxy endblocking units are described in Brown et al. U.S. Pat. No. 3,146,251, issued on Aug. 25, 1964. This Brown et al patent is hereby incorporated by reference to show the preparation of these polymer mixtures and to show the polydiorganosiloxanes. Brown et al describe reacting polydiorganosiloxane cyclic trimers with hydroxylated compounds including alcohol, silanols, siloxanols using as the catalyst an organic amine. Dupree in U.S. Pat. No. 3,274,145, issued Sept. 20, 1966, teaches preparing the polydiorganosiloxane mixtures having both hydroxyl end groups and triorganosiloxy unit endgroups from cyclic diorganosiloxanes and triorganosiloxy endblocked polydiorganosiloxane of low molecular weight using an alkali metal catalyst such as potassium hydroxide. Dupree is hereby incorporated by reference to show the preparation of polydiorganosiloxane mixtures having both hydroxyl endgroups and triorganosiloxy endgroups and also to show room temperature curable compositions prepared from such polydiorganosiloxane mixtures acyloxysilane crosslinkers, such as methyltriacetoxysilane, and curing catalysts if necessary. The catalysts can be metal carboxylates such as tin carboxylates. The acyloxysilane crosslinked polydiorganosiloxane compositions can readily be packaged in a single package. Although it is possible to package these in two packages, such compositions are most often found available in a moisture protected single package and find utility as sealants and adhesives. Other compositions comprising polydiorganosiloxane and acyloxysilicon functional crosslinkers are disclosed in U.S. Pat. No. 3,035,016, issued May 15, 1962 and Bruner U.S. Pat. No. 3,077,465, issued Feb. 12, 1963, which are hereby incorporated by reference to show compositions curable at room temperature and which comprise polydiorganosiloxane and acyloxy silicon crosslinkers.

Sweet in U.S. Pat. No. 3,189.576, issued June 15, 1965, and Johnson et al in U.S. Pat. No. 3,398,112, issued Aug. 20, 1968 describe room temperature curable single package compositions (they use the term one-component to refer to single package) which comprise polydiorganosiloxane and ketoximo-or oximo-silicon crosslinkers. Sweet and Johnson et al are hereby incorporated by reference to show compositions comprising polydiorganosiloxane and ketoximo-silicon crosslinkers or oximo-silicon crosslinkers.

Weyenberg U.S. Pat. No. 3.334,067. issued Aug. 1, 1967 describes a room temperature vulcanizable single package composition which comprises a polydiorganosiloxane, a trialkoxysilane crosslinker, and a beta-dicarbonyl titanium compound. Weyenberg is hereby incorporated by reference to show the compositions comprising polydiorganosiloxane, trialkoxysilane crosslinker, and titanium compound. Weyenberg is only an example of many such patents describing such compositions. Brown et al in U.S. Pat. No. 3,161,614, issued Dec. 15, 1964 and Reissue No. 29,760, issued Sept. 12, 1978, describe polydiorganosiloxanes having dialkoxymonoorganosiloxy endblocking units and trialkoxysiloxy endblocking units which can be used in making single package room temperature curable compositions similar to those described by Weyenberg. The Brown et al patent and reissue are hereby incorporated by reference to show polydiorganosiloxane having alkoxy functional endblocking units and compositions prepared therefrom.

Another room temperature vulcanizing composition comprising a polydiorganosiloxane and a hydrolyzable crosslinker is described by Toporcer et al in U.S. Pat. No. 3,817,909, issued June 18, 1974, and by Klosowski in U.S. Pat. No. 3,996,184, issued Dec. 7, 1976. These patents describe compositions for single packages and for two packages. The compositions comprise hydroxyl endblocked polydiorganosiloxanes, diorganodi-(N-organoacetamido)silane, and polyfunctional aminoxysilicon compound. Whether the compositions are single package compositions or two package compositions is dependent upon the amounts of the ingredients. These patents are hereby incorporated by reference to show compositions which cure at room temperature and contain acetamidosilanes and aminoxy silicon compounds. Brady et al in U.S. Pat. No. 3,766,128, issued Oct. 16, 1973, describe similar compositions except they comprise hydroxyl endblocked polydiorganosiloxane, methylvinyldi-(N-methylacetamido)silane, and monoorganotriaminosilane. Brady et al is hereby incorporated by reference to show such compositions. Clark et al in U.S. Pat. No. 3,766,127, issued Oct. 16, 1973, describes similar compositions except they comprise hydroxyl endblocked polydiorganosiloxane, diorganodi-(N-organoacetamido)silane, and monoorganotri-(N-organoacetamido)silane. Clark et al is hereby incorporated by reference to show such compositions.

Polmanteer in U.S. Pat. No. 2,927,907, issued Mar. 8, 1960, and Hyde in U.S. Pat. No. 3,094,497, issued June 18, 1963 describe two package compositions which cure at room temperature and comprise when the contents of the packages are mixed, hydroxyl endblocked polydiorganosiloxane, alkoxysilanes or alkoxypolysilicates, and a catalyst. These patents are hereby incorporated by reference to show two package compositions which cure at room temperature and contain alkoxy compounds. Other patents which describe compositions which cure spontaneously at room temperature are exemplified by U.S. Pat. Nos. 2,833,742; 2,843,555; 2,902,467; 2,934,519; and 2,999,077.

Compositions which cure by a platinum catalyzed reaction between Si—H and Si—CH=CH$^2$ are described in Speier et al U.S. Pat. No. 2,823,218, issued Feb. 11, 1958; in Willing U.S. Pat. No. 3,419,593, issued Dec. 31, 1968; and Polmanteer et al. U.S. Pat. No. 3,697,473, issued Oct. 10, 1972, These compositions comprise polydiorganosiloxane containing aliphatic unsaturation, such as vinyl or allyl bonded to silicon atoms and usually the endblocking units are triorganosiloxy units which contain the aliphatic unsaturation, silicon compounds which contain siliconbonded hydrogen atoms as the crosslinker and in the case of Polmanteer et al also contains a chain extender, and a platinum catalyst. Such compositions spontaneously begin to cure at room temperature when mixed, sometimes very quickly and other times at a slower rate depending upon the nature of the aliphatically unsaturated siloxane, the Si—H compound, and the platinum catalyst used. To extend the pot life or shelf life of the compositions, a platinum catalyst inhibitor can be used to prolong the cure time at room temperature. Such platinum catalyst inhibitors include aromatic heterocyclic nitrogen compounds, pyridazine, pyrazine, quinoline, 2,2'-biquinoline, bipyridine, naphthyridine, quinaldine, dialkyl formamides, thioamides, alkylthioureas, and ethylene thiourea as described in U.S. Pat. No. 3,188,299; the organophosphorus compounds described in U.S. Pat. No. 3,188,300; benzotriazole as described in U.S. Pat. No. 3,192,181; the nitrile compounds described in U.S. Pat. No. 3,344,111; the halocarbons described in U.S. Pat. No. 3,383,356; the acetylenic compounds described in Kookootsedes et al U.S. Pat. No. 3,445,420, issued May 20, 1969, to which is hereby incorporated by reference to show preferred platinum catalyst inhibitors of the acetylenic type; the vinylsilazanes described in U.S. Pat. No. 3,453,233; the sulfoxide compounds described in U.S. Pat. No. 3,453,234; and the salts described in U.S. Pat. No. 3,532,649.

Platinum catalysts are well known in the art such as the list described in Polmanteer et al which is hereby incorporated by reference to show platinum catalysts. Polmanteer et al is also incorporated by reference, along with Kookootsedes et al to show aliphatically unsaturated polydiorganosiloxanes and Si—H containing compounds. A preferred platinum catalyst is described by Willing which is hereby incorporated by reference. Also incorporated by reference is Speier et al.

The polyorganosiloxane compositions of the present invention can be made into foams or sponges by adding blowing agents which are well known in the art and include carbon dioxide, volatile gasses such as the fluorocarbons, compounds which decompose to for gas. A particular useful foam is described by Smith in U.S. Pat. No. 3,923,705, issued Dec. 2, 1975, teaches siloxane foams which can be formed by blending a polyorganosiloxane having silicon-bonded hydroxyl groups with polyorganosiloxane having silicon-bonded hydrogen atoms in the presence of a platinum catalyst. The blend causes a reaction which produces hydrogen gas which in turn produces the foam. Smith is hereby incorporated by reference to show the production of this type of foam.

The polydiorganosiloxane can vary from a thin fluid to a non flowing gum, having viscosities of from 0.1 to greater than 30,000 Pa.s at 25° C. The polydiorganosiloxane is composed of predominately diorganosiloxane units, however, some of the polydiorganosiloxanes can contain small amounts of monoorganosilsesquioxane units and silicon dioxide units, and in some cases the polydiorganosiloxane will have triorganosiloxy units as the endblocking groups. The organic groups bonded to the silicon atoms can be monovalent hydrocarbon radicals such as alkyl radicals, such as methyl, ethyl, propyl, hexyl, and octadecyl; alkenyl radicals, such as vinyl, allyl, cyclohexenyl, hexenyl, octenyl, and methallyl; cycloaliphatic hydrocarbon radicals such as cyclopentyl, cyclohexyl, tertiary butyl cyclohexyl, and methylcyclohexyl; aralkyl hydrocarbon radicals, such as benzyl, beta-phenylethyl, and beta-phenylpropyl; and aryl hydrocarbon radicals, such as phenyl, xenyl, tolyl, xylyl, and naphthyl; halogenated hydrocarbon radicals such as chloromethyl, beta-chloropropyl, bromoxenyl, 3,3,3-trifluoropropyl, alpha,alpha,alpha-trifluorotolyl, chlorophenyl, trifluorovinyl, and chlorocyclohexyl; and cyanoalkyl such as beta-cyanoethyl, beta-cyanopropyl, gamma-cyanopropyl, and omega-cyanooctadecyl. The preferred organic radicals bonded to the silicon atoms of the polydiorganosiloxane are methyl, phenyl, vinyl, 3,3,3-trifluoropropyl, and ethyl. Preferred polydiorganosiloxanes are the polydimethylsiloxanes in which the endblocking units are either hydroxyl or dimethylvinylsiloxy groups.

The compositions of this invention comprise the polydiorganosiloxane and anhydrous salts selected from di(alkali metal) hydrogen phosphate, alkali metal dihydrogen phosphate, di-(alkali metal) hydrogen phosphite, alkali metal dihydrogen phosphite, and mixtures thereof. The compositions can also contain crosslinking agents, curing catalysts, fillers, plasticizers, pigments and colorants, compression set additives, flame retardant additives, and heat stability additives.

The fillers can include treated and untreated fillers, and reinforcing and non-reinforcing fillers if suitable for the particular composition being prepared. Fillers include reinforcing fillers such as fumed silica, precipitated silica, and silica zerogels, semi-reinforcing and non-reinforcing fillers include alumina, titanium dioxide, zirconia, magnesia, zinc oxide, aluminum silicate, mica, glass, diatomaceous earth, sand, crushed quartz, carbon black, graphite, and the like. The alkali metal salts of phosphoric acid or phosphorous acid which contain hydrogen include the following compounds and mixtures of such compounds, dipotassium hydrogen phosphate, potassium dihydrogen phosphate, dipotassium hydrogen phosphite, potassium dihydrogen phosphite, disodium hydrogen phosphate, sodium dihydrogen phosphate, disodium hydrogen phosphite. sodium dihydrogen phosphite, and similar salts of lithium, rubidium, and cesium. The preferred alkali metal salts are the mixtures of dipotassium hydrogen phosphate and potassium dihydrogen phosphate. The amount of the salt present in the compositions is small, from 0.0002 to 0.052 weight percent based on the total weight of the composition. Preferably, the amount of the salt is from 0.005 to 0.01 weight percent based on the weight of the composition.

The alkali metal salt can be added to the composition in a number of ways. The means of addition are not particularly critical except to provide the named salts as being present and well dispersed in the composition. One method is merely to add the amount of anhydrous alkali metal salt to the composition being prepared. Another method is to add the anhydrous salt to the polydiorganosiloxane which is then used to make the silicone curable composition. The salt may also be masterbatched by adding larger amounts of the anhydrous salt to polydiorganosiloxane and/or filler of provide a concentrate which will allow a more accurate measure of the amount of salt added. The masterbatch method may be particularly useful because it allows control of the amount and also provides a source for addition to more than one kind of composition. Another method of providing compositions with the salt is to neutralize polydiorganosiloxane which has been prepared by polymerizing cyclic polydiorganosiloxanes with potassium hydroxide, sodium hydroxide, potassium silanolate, or sodium silanolate with phosphoric acid or phosphorous acid. This method is suitable but may be limited because of the difficulty in trying to regulate the amount of salt present.

The presence of the alkali metal salt improves the compression set of silicone rubber products prepared from curable compositions, particularly the compositions which are made into silicone foam. Also the flame retardancy of such compositions is improved. Other properties may also be improved. These improvements result without the loss of other essential properties, such as insulation properties, and heat stability.

The following example is present for illustrative purposes which does not limit the present invention which is delineated in the claims.

EXAMPLE

The flame retardant properties of several polydiorganosiloxanes were evaluated by observing their burning rate upon thermal degradation. The polydiorganosiloxanes described below with additives were evaluated.

Composition

A. A dimethylvinylsiloxy endblocked polydimethylsiloxane having a viscosity at 25° C. of about 0.4 Pa.s. The potassium content was less than 0.5 ppm, none detected. The source of potassium, if any, was unknown.

B. The polymer of A. with 0.00088 weight percent anhydrous potassium carbonate (8 8 ppm K ) added to provide 0.0005 weight percent potassium (5 ppm K).

C. The polymer of A. with 0.00111 weight percent anhydrous dipotassium hydrogen phosphate (11.1 ppm K ) was added to provide 0.0005 weight percent potassium (5 ppm K).

The above compositions were tested by placing 70 to 100 gram sample into a three inch diameter dish and placing it in a cone calorimeter. The sample was exposed to a heat flux of 60 kW/m$^2$ which resulted in thermal degradation of the polymer. The resulting volatile depolymerization products were ignited and the heat release as a function of time was measured. The results of the test were as shown in the following table wherein the peak heat release occurred at about 75 seconds into the burn where the rate of heat release for each composition is shown, the sum of the heat release after 100 seconds was as shown in the table where the values are in MJ/m$^2$, and the sum of the heat release after 450 seconds was as shown in the table.

TABLE

| POLYMER | PEAK HEAT RELEASE RATE, kW/m$^2$ | SUM OF HEAT RELEASE AFTER 100 SEC., MJ/m$^2$ | SUM OF HEAT RELEASE AFTER 450 SEC., MJ/m$^2$ |
| --- | --- | --- | --- |
| A | 114 | 5.5 | 39 |
| B | 160 | 8 | 51 |
| C | 92 | 5 | 34 |

Elastomers made from these polymers exhibited the same relative flame retardancy as the polymers. Other polymers investigated showed equivalent results, such as a dimethylvinylsiloxy endblocked poly-co-(dimethylsiloxane-methylvinylsiloxane) having 0.142 mol percent methylvinylsiloxane units and a William plasticity of 0.055 to 0.065 inch. Compositions were prepared and tested where the amount of anhydrous potassium carbonate was 0.0062 weight percent (62 ppm K$_2$CO$_3$) to provide 0.0035 weight percent potassium (35 ppm K) and the amount of anhydrous dipotassium hydrogen phosphate Was 0.0078 weight percent (78 ppm K$_2$HPO$_4$) to provide 0.0035 weight percent potassium (35 ppm K). As shown by the above table, the presence of potassium carbonate increases the rate of burning compared to low potassium content and dipotassium hydrogen phosphate. The dipotassium hydrogen phosphate showed the lowest heat release at these very small amount.

That which is claimed is:

1. In a silicone rubber comprising the product obtained by curing a composition which is based on a polydiorganosiloxane, the improvement consisting of having present in the composition from 0.0002 to 0.052 weight percent of an anhydrous salt selected from the group consisting of di-(alkali metal) hydrogen phosphate, an alkali metal dihydrogen phosphate, a di-(alkali metal) hydrogen phosphite, an alkali metal dihydrogen phosphite, and mixtures thereof.

2. The silicone rubber of claim 1 in which the alkali metal is selected from the group consisting of potassium and sodium.

3. The silicone rubber of claim 2 in which the alkali metal is potassium.

4. The silicone rubber of claim 3 in which the salt is a mixture of dipotassium hydrogen phosphate and potassium dihydrogen phosphate.

5. A silicone rubber composition comprising a polydiorganosiloxane and an anhydrous alkali metal salt of phosphoric acid or phosphorous acid or mixtures thereof in which the salt contains hydrogen and is present in amounts of from 0.0002 to 0.052 weight percent based on the total weight of the composition.

6. The silicone rubber composition in accordance with claim 5 in which the alkali metal of the alkali metal salt is selected from the group consisting of potassium and sodium.

7. The silicone rubber composition in accordance with claim 6 in which the alkali metal is potassium.

8. The silicone rubber composition in accordance with claim 7 in which the alkali metal salt is a mixture of dipotassium hydrogen phosphate and potassium dihydrogen phosphate.

9. A method of improving the flame retardant property of a silicone rubber comprising incorporating into the silicone rubber composition, before curing, from 0.0002 to 0.052 weight percent of an anhydrous salt selected from the group consisting of di-(alkali metal) hydrogen phosphate, alkali metal dihydrogen phosphate, di-(alkali metal) hydrogen phosphite, alkali metal dihydrogen phosphite, and mixtures thereof.

10. The method in accordance with claim 9 in which the salt is a mixture of dipotassium hydrogen phosphate and potassium dihydrogen phosphate.

11. The silicone rubber composition in accordance with claim 5 further comprising a blowing agent to generate a silicone rubber foam when the silicone rubber composition is cured.

* * * * *